(12) United States Patent
Lutz et al.

(10) Patent No.: US 11,002,337 B2
(45) Date of Patent: May 11, 2021

(54) TIRE-BALANCING SYSTEM AND USE THEREOF

(71) Applicant: WEGMANN automotive GmbH, Veitshöchheim (DE)

(72) Inventors: Michael Lutz, Veitshöchheim (DE); Christian Bauer, Veitshöchheim (DE); Diana Schmitt, Veitshöchheim (DE)

(73) Assignee: WEGMANN Automotive GmbH

( * ) Notice: Subject to any disclaimer, the term of this patent is extended or adjusted under 35 U.S.C. 154(b) by 1 day.

(21) Appl. No.: 16/529,070

(22) Filed: Aug. 1, 2019

(65) Prior Publication Data
US 2019/0351718 A1    Nov. 21, 2019

Related U.S. Application Data

(63) Continuation-in-part of application No. 15/624,325, filed on Jun. 15, 2017, now abandoned, which is a continuation of application No. PCT/EP2015/079644, filed on Dec. 14, 2015.

(30) Foreign Application Priority Data

Dec. 16, 2014  (EP) .................................. 14198303

(51) Int. Cl.
*F16F 15/36*     (2006.01)
*B60C 19/00*    (2006.01)

(52) U.S. Cl.
CPC ............ *F16F 15/36* (2013.01); *F16F 15/366* (2013.01); *B60C 19/003* (2013.01)

(58) Field of Classification Search
CPC ....... B60C 19/003; F16F 15/36; F16F 15/363; F16F 15/366
See application file for complete search history.

(56) References Cited

U.S. PATENT DOCUMENTS

| | | | |
|---|---|---|---|
| 2,333,587 A | 11/1943 | Salfisberg | |
| 2,962,192 A | 11/1960 | Volckening | |
| 6,249,971 B1 | 6/2001 | Fogal | |
| 7,360,846 B2 | 4/2008 | Krueger | |
| 2008/0000786 A1 | 1/2008 | Collotta | |
| 2017/0282653 A1* | 10/2017 | Lutz .................. | B65D 75/5811 |

FOREIGN PATENT DOCUMENTS

| | | |
|---|---|---|
| EP | 3034431 | 4/2017 |
| LU | 35.421 | 8/1957 |

* cited by examiner

*Primary Examiner* — Jason R Bellinger
(74) *Attorney, Agent, or Firm* — Yakov Sidorin; Quarles & Brady LLP

(57) ABSTRACT

A tire-balancing including a tire-balancing material in a first pocket of the system and at least one tire accessory such as a tire-valve core in the second pocket of the system. The first and second pockets are spatially separated from one another with a seal and a line of perforation. The first pocket has a duct dimensioned to release the particles, oriented towards the second container, and sealed from the second container. The methods for fabrication of the tire-balancing system and balancing a tire with the use of such system. Before use, the first pocket is opened by separating the second pocket along the perforation, and placed in a tire let a flow of the particles from inside the first container into the tire through the duct. The tire-valve core is removed from the second container and applied to the wheel.

9 Claims, 8 Drawing Sheets

TIRE-BALANCING SYSTEM AND USE THEREOF

CROSS-REFERENCE TO RELATED APPLICATIONS

This application is a continuation-in-part from the U.S. patent application Ser. No. 15/624,325 filed on Jun. 15, 2017 and now published as US 2017/0282653, which is a continuation of the International Application No. PCT/EP2015/079644 filed on Dec. 14, 2015, which in turn designates the United States and claims priority from the European Application No. 14198303.1 filed on Dec. 16, 2014. The disclosure of each of the abovementioned applications is incorporated herein by reference.

BACKGROUND

1. Field of the Invention

The invention relates to balancing of vehicular tires and, specifically, to a tire-balancing system judiciously configured to contain and be used to disperse or apply a balancing material when placed into the interior of a vehicular tire. Such balancing material may include small particles, such as small beads, which may be made of a ceramic material or silicate, for example.

2. Description of Relevant Art

For balancing of vehicular wheels, balancing weights (for example, discrete balancing weights) are typically attached to the rim of a wheel. As an alternative and to dynamically balance tires of vehicles, a certain amount of small particles of a balancing material (also referred to as compensation material) is placed or inserted into the tire. Unlike the balancing weights, the balancing material is not fixed to the rim. Instead, such balancing material is allowed to freely flow or move in the interior of the tire. As a result of the free movement, the balancing material is mainly accumulated in such areas of the inner surface of the tire where the tire mass is lower than in other areas—whether due to manufacturing tolerances or due to wear. By having the additional mass of the balancing (compensating) material accumulate in such target areas, the mass distribution over the outer surface of the tire is substantially equalized and evened out, leading to a substantially balanced wheel.

U.S. Pat. No. 6,249,971 B1 discloses a compensating material composition that includes an inorganic material and an organic material. The compensating material is formed or shaped into pellets or briquette(s), which can easily be inserted into the tire and which break(s) apart in the tire upon rotation of the tire to release individual particles. The disadvantage of such approach is a required complex processing of the compensating material. Furthermore, auxiliary materials have to be added to the compensating material to maintain the shape of the pellets or briquettes. These materials may cause unwanted effects (for example, they may cause a premature aging of the rubber material of the tire) and therefore may affect safety and reliability of the vehicle. Moreover, additional packaging is required to prevent disintegration of such compensating material during shipment.

U.S. Pat. No. 7,360,846 B2 discloses a method for treating a tire to balance a wheel by using a container that has a removable resilient clip and an adhesive to keep the container temporarily closed. After inserting the container into the tire, the tire has to be impacted or hit to open the container. The way the tire is impacted may be critical as the impact may either not be strong enough, or not be applied at the correct location to force the container to open. If the impact is too hard, on the other hand, it may lead to a damage of the tire itself.

SUMMARY

Embodiments of the invention provide a tire-balancing system that includes balancing material in a cavity or pocket thereof and a method for applying balancing material into a tire with the use of such tire-balancing system. The system is easy to use, it is judiciously structured to prevent loss of the balancing material during handling, and does not require any additional packaging for shipment.

In one embodiment, a tire-balancing system includes a first portion with a container or pocket or cavity with the tire balancing material (that includes particles of the balancing material) in the cavity. The inner space (~cavity) has an opening duct that is appropriately sealed to enclose and contain the balancing material within the cavity during shipment and before and until the application or dispensation of the material into the tire. The first portion has a perforation for breaking off the seal to afford access to the cavity through the opening duct and to allow the balancing material to flow out from inside the cavity of the first portion through the opening duct. Such configuration facilitates the use of a robust container that easily can withstand shipment without losing balancing material held in its inner volume. Before the use, the seal is broken off or separated from the first portion to open the opening duct and allow the balancing material to flow out of or dispense from the first container.

In a related embodiment, a second portion of the tire-balancing system is sealingly attached to or combined with the first portion (the first portion, as before, contains a cavity with the tire-balancing material present therein). The second portion also defined a cavity that preferably encloses at least one tire-accessory (which may be required for completing the wheel assembly and/or for using the balancing material itself). Such an accessory may include a tire valve core and/or a tire valve and/or a valve cap. In a specific implementation, the accessory includes the valve core having at least one means to prevent intrusion of the balancing material. Indeed, typical valve cores may be blocked when balancing material is intruding or finding its way into the valves. Therefore, it may be desirable to use specifically configured valve cores having either small openings or ducts which allow only the flow of air, but retain the balancing material outside of the valve cores at the same time. In a related implementation, there may also be some kind of filter or sieve arranged at the valve core. If the accessory includes a valve, it also includes a valve core, which is required for functioning of the valve. If the accessory includes a valve cap, it preferred that the valve cap has a special marking to allow, upon installation on a tire, the identification of such tire containing the tire-balancing material.

To obtain access to the contents of the cavity or pocket of the second portion of the tire-balancing system, the second portion preferably should be removed or separated from or torn off and away from the first portion of the tire-balancing system. The overall tire-balancing system is preferably configured such that this step of separation of the first and second portions of it from one another removes or opens the seal sealing the opening duct, and therefore unobstructs the opening duct to the contents of the cavity of the first portion of the tire-balancing system.

In a related simplified embodiment, the tire-balancing system includes only a first portion containing a duct that is closed, prior to the use of the system, with a tab or sealing strip (which tab or sealing strip can be removed from the system along a line of perforation).

The disclosed embodiments offer a simple way to use a tire-balancing system that holds a tire-balancing material. The enclosure of the tire-balancing system may be made of a flexible material or from a comparatively rigid and/or solid material, which holds and protects the balancing material within the cavity or pocket of the tire-balancing system during shipment. Before applying the balancing material to a wheel, the person who is applying the balancing material (the user) is motivated or urged or directed to get a hold of the tire-accessory (which is required to complete the assembly of the wheel) by removing or tearing off the second portion of the tire-balancing system from the first portion thereof, thereby opening the duct of the first portion in the process. Therefore, it is nearly impossible for the person applying the balancing material to omit opening the duct (which omission would prevent the balancing material from flowing into the tire once the opened first container is placed into the tire). Therefore, the addition of the tire accessory contained in the second portion of the tire-balancing system to the first portion of the tire-balancing system makes the tire-balancing system substantially failure-proof in use. Moreover, as a result of the addition or placement of a necessary tire-accessory to or within the very same tire-balancing system that holds or stores the balancing material to be applied to the tire, the use of an incorrect accessory (such as a wrong valve core and/or valve cap) in such tire is prevented.

The duct at the first pocket is shaped to prevent a dispensation or coming off of the balancing material from inside the first pocket at the moment when the second pocket is torn off and during the placement of the first container within or into the tire. As long as the first pocket is held upright with the duct at the top of the first pocket, all balancing material is forced to remain inside the first pocket. When the first pocket is placed in the tire, which is usually done in by positioning the first pocket horizontally, the balancing material is allowed to start flowing out of the first pocket and smoothly distribute within the tire. When the complete wheel (with a tire and a rim together with a valve core and/or valve cap) has been assembled and mounted to a car, more and more of the balancing material is released through the duct during the rotation of the wheel. This gradual release of the balancing material into the tire ensures an even distribution of the balancing material.

It is preferred, to have the tire-balancing system made of plastic(s) and/or paper, and/or a plastic-paper composite material. It is preferred, if the plastic component of the material of the body of the container system is placed at the inner side to prevent the particles of the balancing material to penetrate through the surface of the container system. Preferably, paper is placed at the outside surface of the container system, to optionally carry printed type information and/or using instructions. Most preferably, the first and second portions of the tire-balancing system are configured as bags or cavities. It is preferred, if the perforation comprises a plurality of holes, preferably small holes or slots, which may have been punched into the container. At least one of the holes of the perforation may penetrate into or through the (inner volume of the) first cavity and/or the (inner volume of the) second cavity. Such configuration may be beneficial in allowing air to exit from the first cavity and/or the second cavity when the first and second portions of the system are compressed, thereby saving space for transport and storage. Alternatively, instead of the perforation any predetermined breaking point or area may be defined between the first and second cavities.

A related embodiment provides a system for tire balancing. The system includes at least one of cavities described previously. Preferably, the first cavity includes and contains particles of a tire-balancing material (which may contain metal, ceramics, and/or sand). The second cavity, when present, may contain at least one tire accessory, which preferably may be a tire valve core and/or a tire valve and/or a valve cap.

Yet another embodiment provides a method for applying balancing material to a wheel. The method includes the steps of opening a first cavity of a tire-balancing system by removing or separating or tearing off a portion containing the second cavity from it along a perforation; placing the first portion of the system with the opened fits cavity within a tire; and releasing the balancing material from the first cavity through a duct into the tire. There may be an additional step of selecting an appropriate size of balancing material from a selection of different sizes of balancing material.

BRIEF DESCRIPTION OF THE DRAWINGS

In the following, the invention will be described by way of example, without limitation of the general inventive concept, on examples of embodiment and with reference to the drawings.

Figure 1:
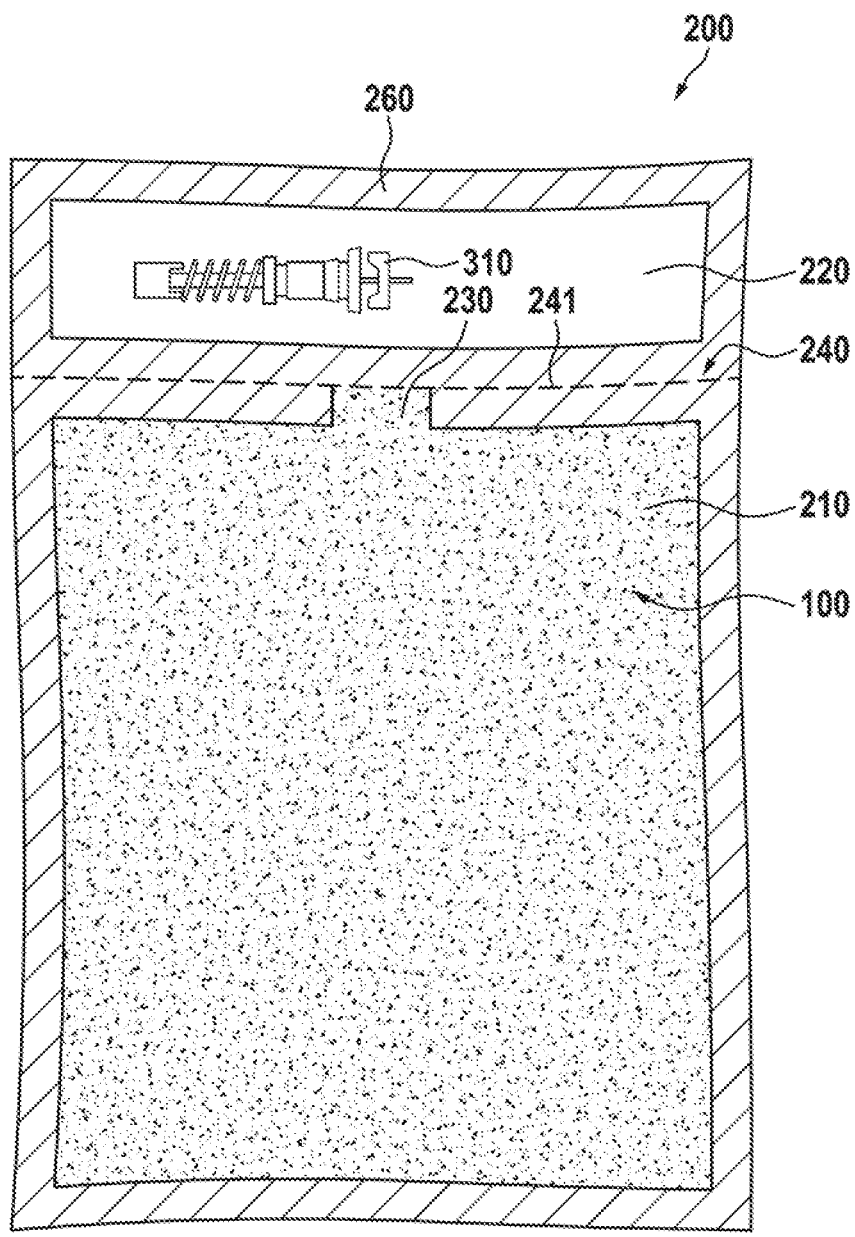
FIG. 1 shows one embodiment of the invention.

It is appreciated that embodiments of the invention can be modified and altered as appropriate, and that only specific embodiments are shown as examples in the drawings and described below in detail. It should be understood, however, that the drawings and detailed description are not intended to limit the invention to the particular specific form(s), but to the contrary, the intention is to cover all modifications, equivalents and alternatives falling within the spirit and scope of the present invention as defined by the appended claims.

DETAILED DESCRIPTION

FIG. 1 illustrates an embodiment of a container system 200, which includes a first container or cavity 210 and a second container or cavity 220. The first container 210 has a duct 230 oriented towards and in the direction of the second container 220. Preferably, the second container 220 is specifically dimensioned to contain at least one tire-accessory 310 (such as, for example, a tire valve core and/or a tire valve and/or a valve cap). The cavities 210, 220 are spatially-separately formed between the two sheets of flexible material that are pressed and/or sealed with one another at least along perimeters of these flexible sheets to preferably form a scaffold or stripe-like sealing element portion of the system 200 that itself contains no cavities of volumes dimensioned to accommodate any contents. Furthermore, a line of perforation 240 is formed between the first container 210 and the second container 220 such that when the second container is separated from the first container along the line of perforation, the duct 230 is opened. The perforation is formed by a plurality of holes 241, preferably small holes or slots, which may have been punched into the container system. As long as the first container is held upright with the duct 230 to the top, the balancing material remains in the first container even when the duct is open. The first container is then placed in a tire, whereby the balancing material slowly flows out of the first container 210 through the duct 230. It is preferred to have the container system made of plastics and/or paper, and/or a combination thereof.

Most preferably, is the system 200 is configured as a paper-plastic-composite bag, although in one specific embodiment the flexible material sheets are chosen such as to make the cavities 210, 220 not suitable for containment of liquid. As shown, the system 200 has a strip-like sealing element or scaffold 260, already mentioned above, which is configured to seal first and a second sheets of material that define, during the fabrication of the system, enclosure(s) of the a first container and a second container. In the embodiment 200, the sealing element 260 includes a first peripheral sealing portion that circumscribes the combination of cavities 210, 220 and a second sealing portion dimensioned as a strip transversely connecting spatially-opposite regions of the first peripheral sealing portion such as to separate and seal the cavities 210, 220 from one another. Generally, the sealing scaffold element 260 may be glued, stemmed, welded, or made by another technology to appropriately seal the container system. As shown, the line of perforation 240 is extended at least along the sealing scaffold 260 and, in a specific case, passes through the width of it.

In one specific implementation, at least one of the holes 241 of the line of perforation 240 can be disposed to penetrate into or through the first container 210 and/or the second container 220. Such arrangement may be chosen to allow air to exit from the inner space of the first container and/or the second container, for example to allow the container(s) to be compressed, which may save space for transport and storage.

Figure 2:
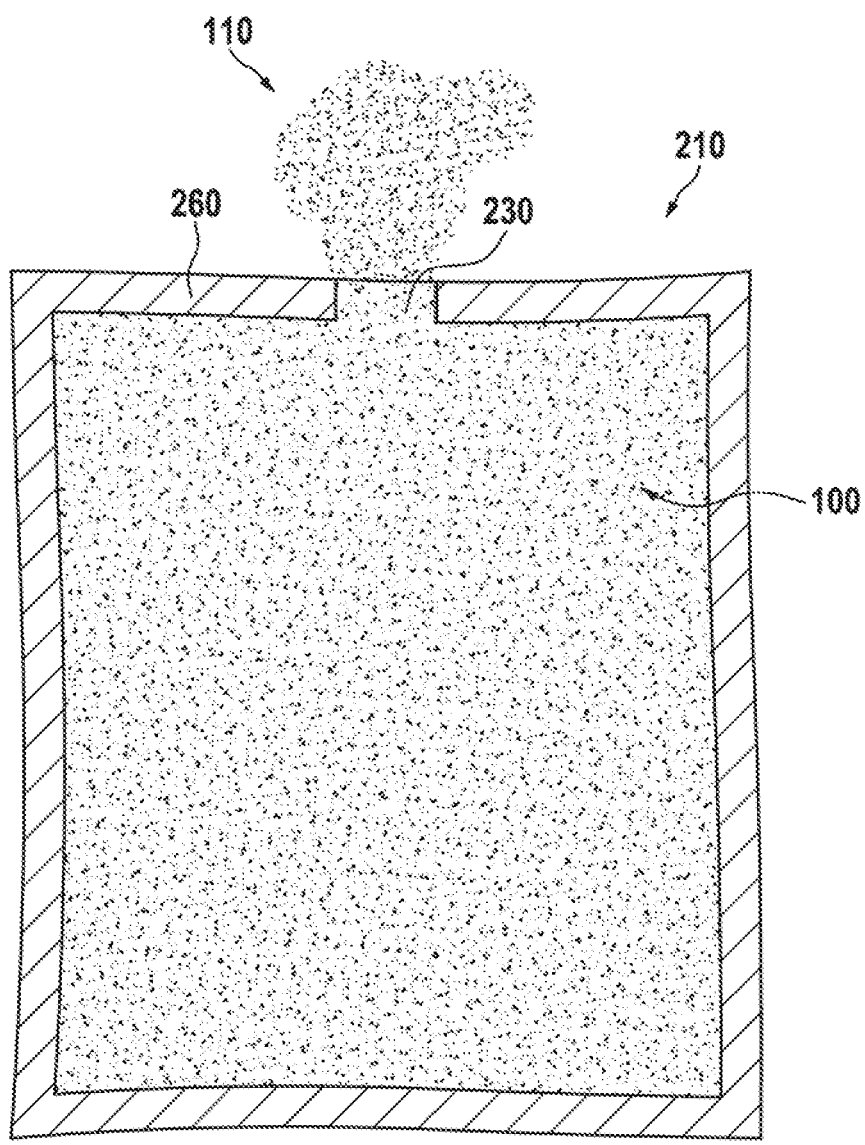
FIG. 2 shows an open first container of an embodiment of the invention.

FIG. 2 illustrates a situation when a portion of the system 200 of FIG. 1 that includes the first container 210 has been separated from the remainder of the system 200 along the line of perforation 240, causing the opening of the duct 230. The balancing material 100 is illustrated to be flowing out of the container, 110, into the surrounding space (~tire).

Figure 3:
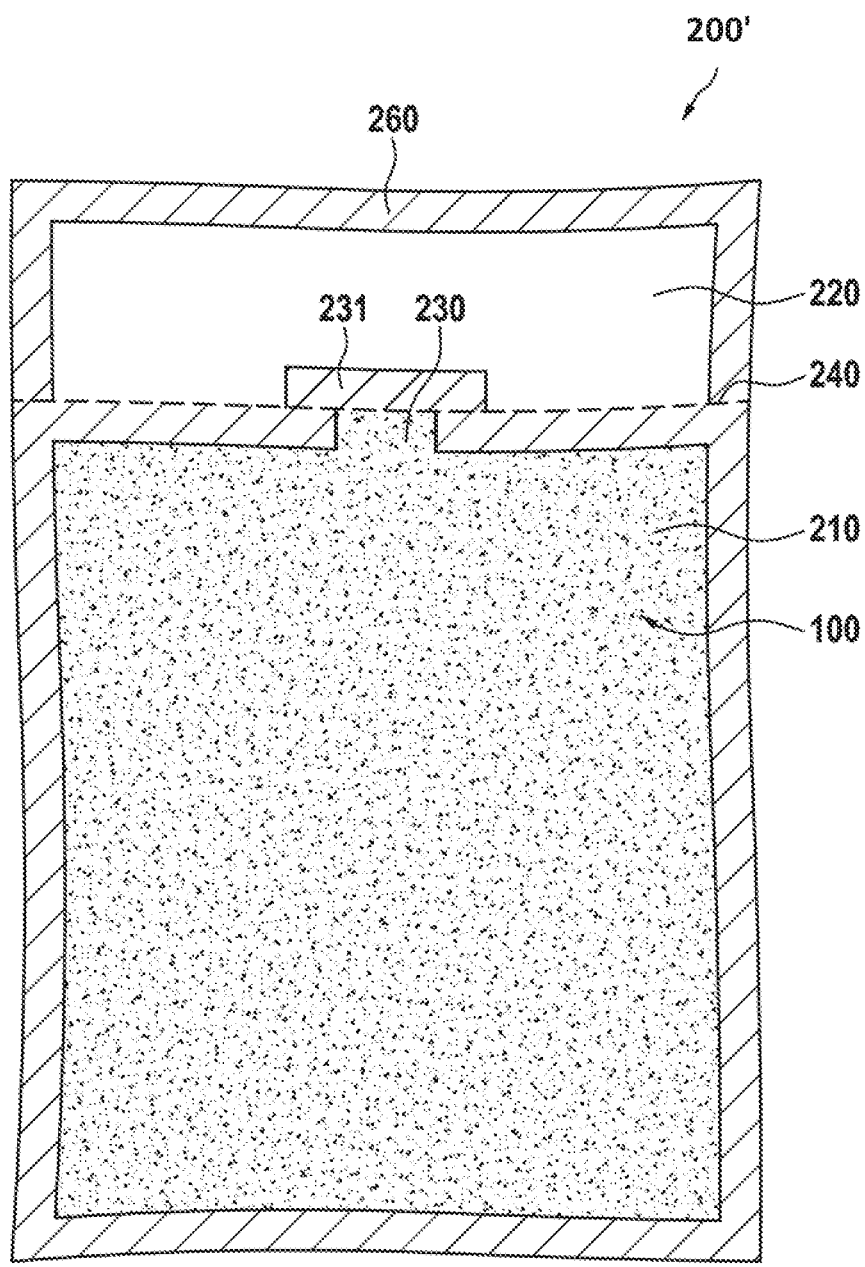
FIG. 3 shows a slightly modified (as compared to that of FIG. 1) embodiment of a container system.

In FIG. 3, a slightly modified 200' of a container system is shown. Here, the duct 230 is covered or sealed with a duct seal 231 (which may also be part of the container system, especially when the cover 231 is configured to be part of the sealing element such as the element 260). The duct seal 231 is separated from the remainder of the system 200' along the line of perforation 240 to open the duct 230 (for example, by tearing off when removing the second container 220 of the system 200'.

Figure 4:
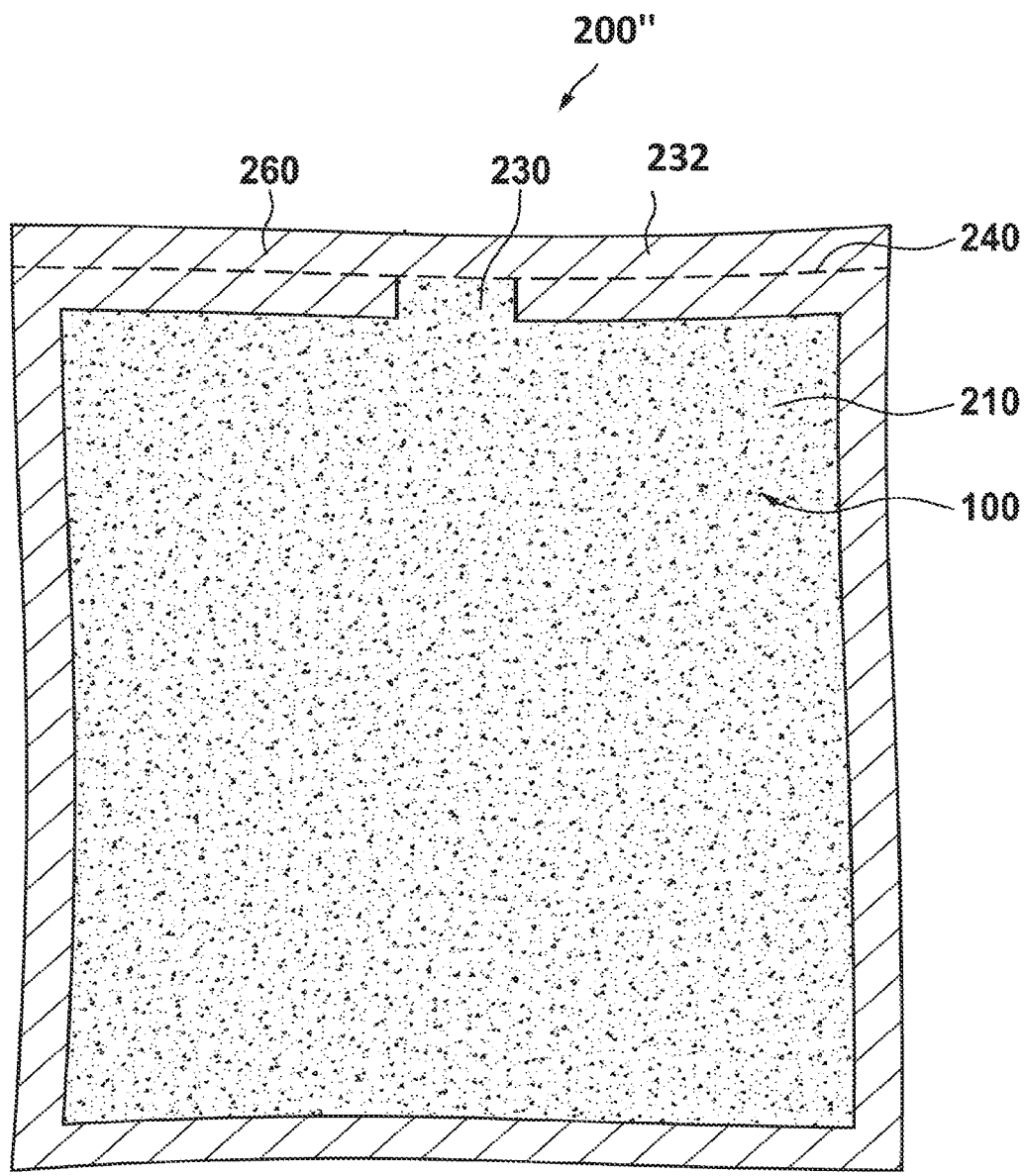
FIG. 4 shows an embodiment with one container.

In FIG. 4, an embodiment 200″ with only one container or cavity 210 is shown. Here, the sealing scaffold element 260 is dimensioned to form only a peripheral seal encircling the cavity 210 and to accommodate the line of perforation 240 to pass through and along one side of the sealing element 260 such as to define an elongated portions of the sealing element 260 as a sealing strip 232. In practice, the sealing strip 232 can be removed from the container system 200″ by removing or tearing it off at the line of perforation 240 to open the duct 230 and to allow the balancing material 100 to exit/flow from the cavity 210 through the opening of the duct 230.

Figure 5:
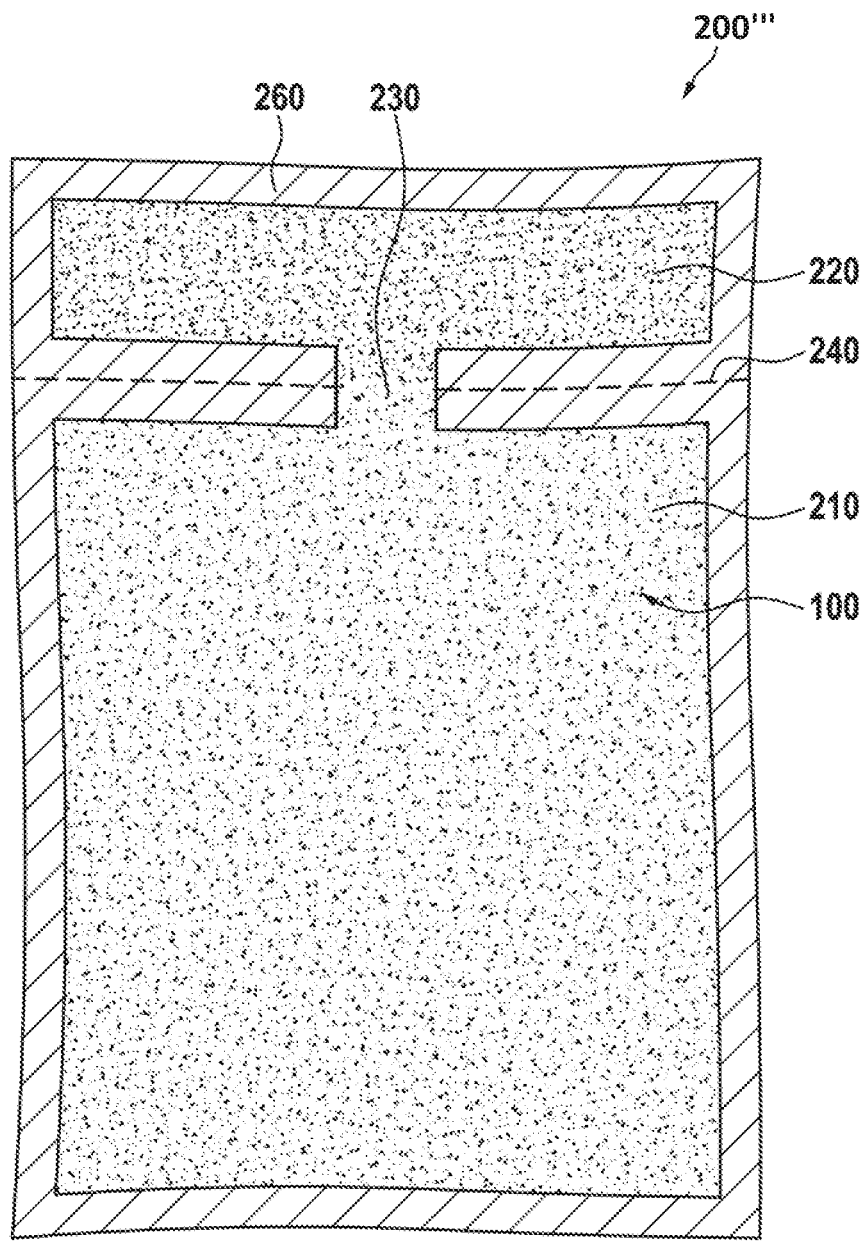
FIG. 5 shows an embodiment with two connected containers.

FIG. 5 illustrates a related embodiment 200‴ with a first container 210 already connected to a second container 220 along the through duct 230. Here, the duct 230 is not closed. Instead, the second container 220 serves as a cover for the duct. Therefore, while the balancing material 100 may freely flow from the first container 210 into the second container 220, the flow of the balancing material 100 outside of the container system 200‴ is prevented as long as the sealing element 260 remains intact. By frustrating the sealing element 260 and tearing off the second container 220 from the first container 210 along the line of perforation 240, the duct 230 is again opened and balancing material 100 can flow to the outside of the system 200‴.

Figure 6:
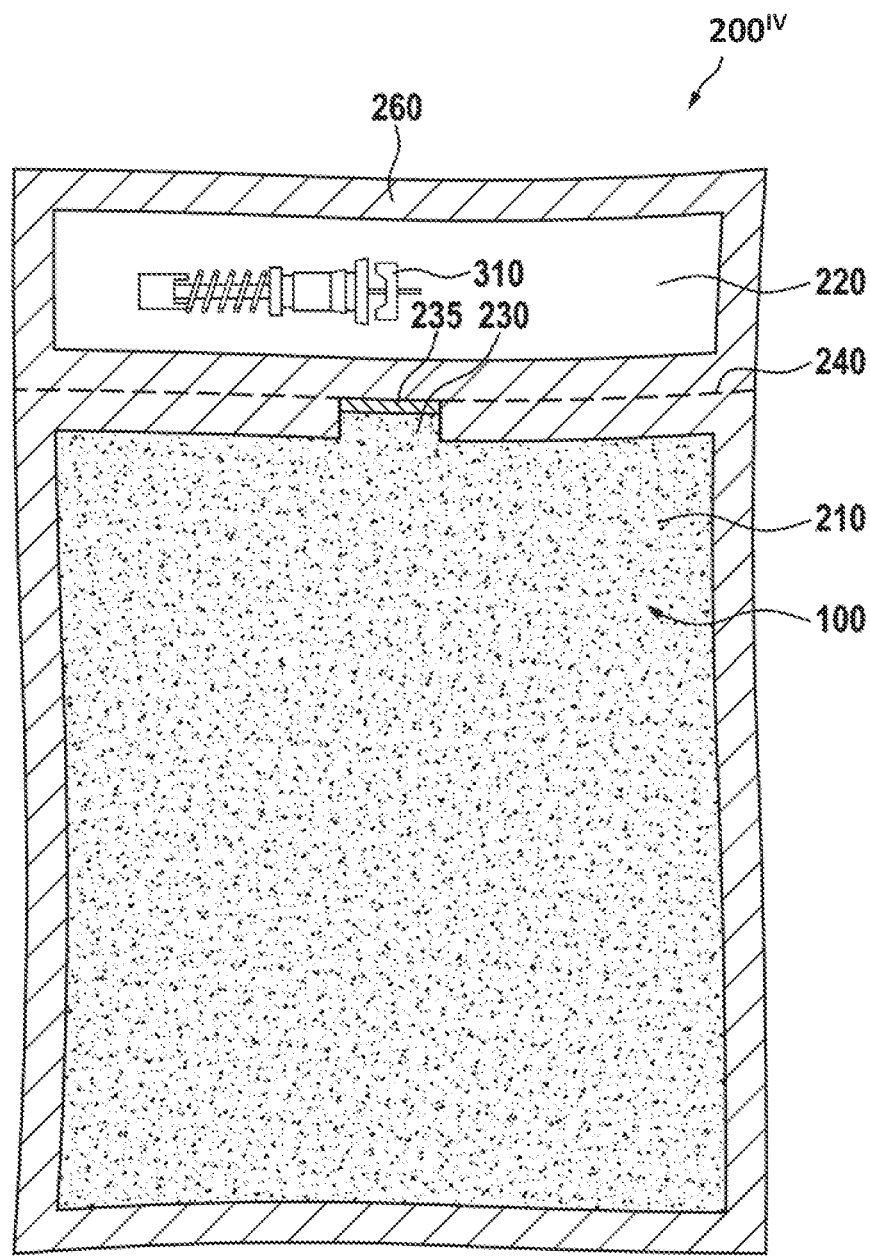
FIG. 6 shows an embodiment with an additional seal.

FIG. 6 illustrates yet another embodiment $200^{IV}$ with an additional seal 235 attached to a transverse portion of the sealing element 260 at the duct 230. This seal 235 may be configured as a small piece of adhesive tape, or it may be made of the same material as that of the container system $200^{IV}$. The embodiment $200^{IV}$ is configured to operate as follows: upon the separation of the two sub-portions of the contained $200^{IV}$ from one another along the line of perforation 240, the cavity 210 remains substantially sealed with the seal 235 until the portion of the system $200^{IV}$ that includes the cavity 210 with the balancing material in it is placed into the tire. Then, the seal 235 opens under mechanical pressure applied to it during the rotation of the tire.

Figure 7:
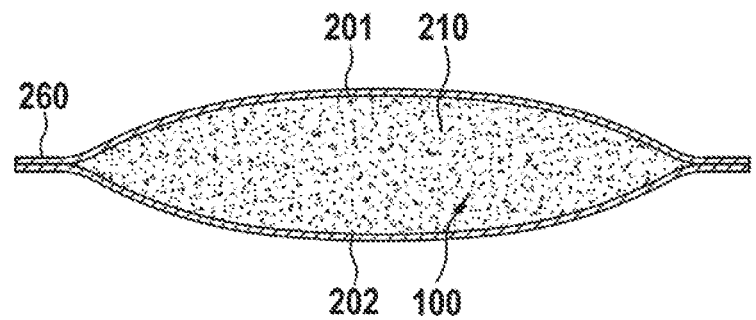
FIG. 7 shows a sectional view through the first container of the embodiment.

In FIG. 7, a sectional view through the first cavity 210 is shown. Here, the overall embodiment of the container system as well as the first cavity 210 is formed with a first flexible layer 201 and a second flexible layer 202, which layers are connected together at the rim/peripheral portion 260. The layers preferably are made of paper and/or plastic(s), and/or a combination thereof. The first container is enclosing balancing material 100.

Figure 8:
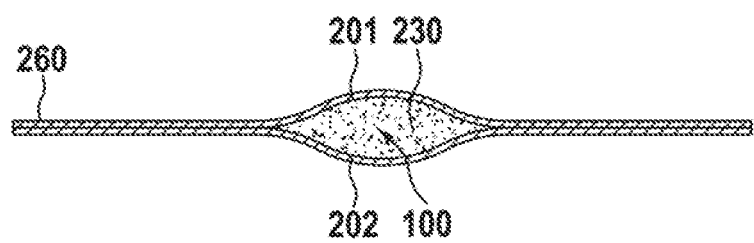
FIG. 8 shows a sectional view through the duct of the embodiment.

In FIG. 8, a sectional view through the duct 230 is shown. Here, again, the first layer 201 and the second layer 202 can be seen.

Figure 9:
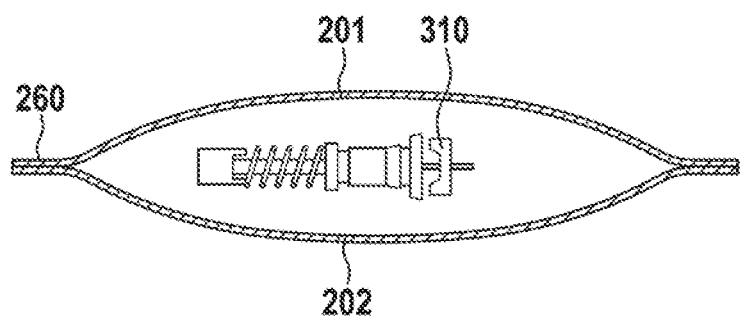
FIG. 9 shows a sectional view through the second container (illustrating additionally, an accessory contained within the second container).

In FIG. 9, a sectional view through the second container is shown. Here, between the first layer 201 and the second layer 202, a tire accessory 310 such as a tire valve may be enclosed, as shown.

Figure 10:
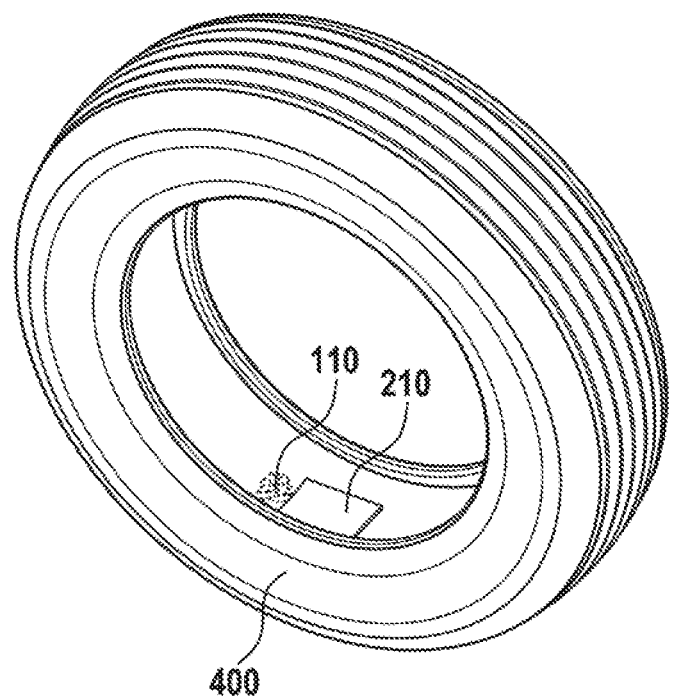
FIG. 10 shows a tire with a first container.

FIG. 10 shows a tire 400 with a first container 210 and particles of balancing material flowing out of the first cavity of the tire-balancing system.

Fabrication of any embodiment of the tire-balancing system that includes both the first and second pockets (with the tire-accessory and tire-balancing material, respectively), may include the steps of disposing a tire accessory at a first location; accumulating or collecting the tire-balancing particles at a second location; and forming the enclosure package that has first and second pockets such that the first pocket contains the first location while the second pocket contains the second location. The formation of the enclosure package may include formation of the enclosure package from first and second flexible sheets of material to have the first and second pockets individually sealed and separated from one another with sealing strip. In one specific case, the inner seal is the only seal present between the first and second pockets. In one case, at least one of the steps of disposing and accumulating is carried out after the step of forming the enclosure package to have the tire accessory enclosed within the first pocket and to have the tire-balancing material enclosed within the second pocket, and followed by sealing each of the first and second pockets. The formation of the enclosure package may include creating a line of perforation through at least one of the first and second flexible sheets between the first and second pockets. The process of fabrication of the vehicular tire-balancing system may additionally include a step of defining a volume of the second pocket to extend into the inner areas up to the line of perforation (and, in a specific case—not beyond the line of perforation).

A method for balancing a vehicular tire with the use of so-formed tire-balancing system includes forming an an opening in a wall of the second pocket (to provide direct unobstructed access to the tire-balancing particles through the opening) while, at the same time, forming a stand-alone first pocket with the tire accessory sealed in such first pocket; disposing the second pocket in the tire to initiate a flow of the tire-balancing particles through the opening into the tire as the tire rotates; and removing the tire accessory from the first pocket and applying the tire accessory to the tire. In a specific case when the sealing strip (the inner seal area) has a perimeter defined by a concave polygon, the step of forming the opening in the wall of the second pocket includes opening the second pocket at that portion of the concave polygon's perimeter, which corresponds to an internal polygon angle exceeding 180 degrees. In substantially any implementation, forming the opening in the wall of the second pocket carried out such that a dimension of the opening is smaller than a width of the package.

It will be appreciated to those skilled in the art having the benefit of this disclosure that implementations of this invention provide a specifically-structured tire-balancing system configured to contain and apply tire-balancing material into the interior of vehicular tires, as well as a method for balancing a vehicular tire with the use of such tire-balancing system. Further modifications and alternative embodiments of various aspects of the invention will be apparent to those skilled in the art in view of this description. For example, in one implementation an embodiment of the tire-balancing system does not include a peel-away top and/or peel-away backing. Alternatively or in addition, in a related embodiment none of the first and second cavities of the tire-balancing system is accessible via a breaking point or area (such as a notch at a perimeter of the tire-balancing system defined between the first and second cavities).

The invention as recited in claims appended to this disclosure is intended to be assessed in light of the disclosure as a whole, including the recitations in the claims and features disclosed in prior art to which reference is made.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 100 balancing material
110 balancing material outside of the tire-balancing system
200, 200', 200", 200''', $200^{IV}$ tire-balancing system
201 first flexible layer
202 second flexible layer
210 first container/cavity/pocket
220 second container/cavity/pocket
230 duct
231 duct seal
232 sealing strip
235 additional duct seal
240 perforation
241 hole of perforation
260 sealing element/scaffold/rim portion of the tire-balancing system
310 tire-accessory
400 tire

What is claimed is:

1. A method for balancing a vehicular tire with the use of a vehicular tire-balancing system that includes
   a package of the vehicular tire-balancing system formed by upper and lower sheets of flexible material sealed with one another along a perimeter of the package to form a peripheral seal area that circumscribes first and second individually sealed pockets within the package, and an inner seal area that separates the first and second pockets from one another,
   a tire accessory in the first pocket; and
   a tire-balancing particles in the second pocket;
   the method comprising:
   by separating the first pocket from the second pocket along the line of perforation, forming an opening in a wall of the second pocket to provide direct unobstructed access to the tire-balancing particles through the opening while, at the same time, forming a stand-alone first pocket with the tire accessory remaining sealed therein;

disposing the second pocket in the tire to initiate an unobstructed flow of the tire-balancing particles through the opening into the tire as the tire rotates; and removing the tire accessory from the first pocket and applying the tire accessory to the wheel.

2. The method according to claim 1, wherein the inner seal area has a perimeter defined by a concave polygon and said forming the opening in the wall of the second pocket includes opening the second pocket at a portion of a perimeter of the concave polygon, which portion corresponds to an internal polygon angle that exceeds 180 degrees.

3. The method according to claim 1, wherein the flexible material is not suitable for containment of a liquid.

4. The method according to claim 1, wherein said forming includes forming the opening in the wall of the second pocket wherein a dimension of the opening is smaller than a width of the package.

5. The method according to claim 1, wherein the tire-balancing system is configured to satisfy at least one of the following conditions:

a) said inner seal is dimensioned as a strip containing a line of perforation formed within a width of the strip; the inner seal area forming the only seal between the first and second pockets; and b) a volume of the second pocket extends into the inner seal area up to the line of perforation but not beyond the line of perforation.

6. A method for forming a vehicular tire-balancing system that includes an enclosure package of the vehicular tire-balancing system formed by upper and lower sheets of a flexible material sealed with one another along a perimeter of the enclosure package to form a peripheral seal area that circumscribes first and second individually sealed pockets within the package, and an inner seal area that separates the first and second pockets from one another, a tire accessory in the first pocket; and a tire-balancing particles in the second pocket;

the method comprising:

disposing the tire accessory at a first location;

accumulating said tire-balancing particles at a second location; and forming the enclosure package having first and second pockets, the first pocket including the first location, the second pocket including the second location, wherein said forming the enclosure package including sealing to one another first and second sheets of the flexible material to form said first and second pockets that are individually sealed and that are separated from one another with a sealing strip and to form the enclosure package configured to be devoid of at least one of a peel-away top, a peel-away backing, and a notch at the perimeter of said enclosure package.

7. The method according to claim 6, wherein said forming the enclosure package include creating a line of perforation through at least one of the first and second sheets between the first and second pockets.

8. The method according to claim 7, wherein said creating the line of perforation includes creating a line of perforation through a width of a sealing strip that connects opposite sides of the perimeter of said enclosure package.

9. The method according to claim 6, further comprising at least one of the following:

a) fabricating the inner seal that is dimensioned as a strip containing a line of perforation formed within a width of the strip; wherein the inner seal is the only seal between the first and second pockets; and b) defining a volume of the second pocket to extend into the inner seal area up to the line of perforation but not beyond the line of perforation.

\* \* \* \* \*